(12) United States Patent
Amit et al.

(10) Patent No.: US 8,682,091 B2
(45) Date of Patent: Mar. 25, 2014

(54) REAL-TIME IMAGE COMPRESSION

(75) Inventors: Jonathan Amit, Omer (IL); Lilia Demidov, Ness-Tziona (IL); Nir Halowani, Holon (IL); Ori Shalev, Kiryat Ono (IL)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 13/213,023

(22) Filed: Aug. 18, 2011

(65) Prior Publication Data

US 2013/0044961 A1   Feb. 21, 2013

(51) Int. Cl.
*G06K 9/36*   (2006.01)
*G06K 9/46*   (2006.01)

(52) U.S. Cl.
USPC ........................................................ 382/239

(58) Field of Classification Search
USPC ......... 382/164, 173, 232, 233, 235, 239, 248; 375/240.01–240.26; 358/1.12, 1.15, 358/426.01, 426.16; 348/43, E13.001; 341/51, 65, 107
See application file for complete search history.

(56) References Cited

U.S. PATENT DOCUMENTS

| | | | |
|---|---|---|---|
| 5,479,210 A | 12/1995 | Cawley et al. | |
| 5,991,515 A * | 11/1999 | Fall et al. | 358/1.15 |
| 6,285,458 B1 | 9/2001 | Yada | |
| 6,385,656 B1 | 5/2002 | Appelman | |
| 6,941,019 B1 * | 9/2005 | Mitchell et al. | 382/232 |
| 7,146,053 B1 * | 12/2006 | Rijavec et al. | 382/233 |
| 7,397,959 B1 | 7/2008 | Volkoff et al. | |
| 7,864,083 B2 | 1/2011 | Mahoney | |
| 2008/0094259 A1 | 4/2008 | Yu et al. | |
| 2009/0240718 A1 | 9/2009 | Rao et al. | |
| 2010/0104015 A1 * | 4/2010 | Chatterjee et al. | 375/240.16 |
| 2012/0229603 A1 * | 9/2012 | Bruls et al. | 348/43 |
| 2013/0044961 A1 * | 2/2013 | Amit et al. | 382/233 |

FOREIGN PATENT DOCUMENTS

JP   2003153011 A   5/2003

* cited by examiner

*Primary Examiner* — Amir Alavi
(74) *Attorney, Agent, or Firm* — Griffiths & Seaton PLLC

(57) ABSTRACT

Exemplary method, system, and computer program product embodiments for real-time image recompression are provided. In one embodiment, by way of example only, compressed segments that are identified as having used at least one of a plurality of inefficient compression operations are partially decoded. The compressed segments are recompressed by employing context mapping. Additional system and computer program product embodiments are disclosed and provide related advantages.

12 Claims, 7 Drawing Sheets

700

| Context | Probability | Range |
|---|---|---|
| Y DC Value (1255) Color sequence short code (red, black, blue), EOB (30) | 2 | [0.0,0.5] |
| Y DC Value (1234) Color sequence short code (red, white, black), EOB (12) | 1 | [0.5,0.75] |
| Y DC Value (56) Color sequence short code (black,white,black), EOB (12) | 1 | [0.75,1] |

FIG. 7

REAL-TIME IMAGE COMPRESSION

BACKGROUND OF THE INVENTION

1. Field of the Invention

The present invention relates generally to computers, and more particularly, to real-time image compression in a computing storage environment.

2. Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these electronic appliances. One of the most noticeable changes introduced by recent computer technology is the inclusion of images, video, and audio to enhance the capabilities of computers and electronic appliances. In the age of multimedia, the amount of information to be processed increases greatly. One popular method of handling large data files is to compress the data for storage or transmission. Therefore, processing very large amounts of information is a key problem to solve.

One example of compressing data or images is by using lossy compression, such as the JPEG (Joint Photographic Experts Group) standard that allows for the interchange of images between diverse applications and open up the capability to provide digital continuous-tone color ac images in anti-media applications. Moreover, other compression format methods have been used to meet the data compression demands, but with such approaches, image details may be lost even thought the quality remains similar to the human eye. Therefore, a need exists to improve the image compression ratio of already compressed image content.

SUMMARY OF THE DESCRIBED EMBODIMENTS

With increasing demand for faster, more powerful and more efficient ways to store information, optimization of storage technologies is becoming a key challenge. Logical data objects (data files, image files, data blocks, etc.) may be compressed for transmission and/or storage. Data compression techniques are used to reduce the amount of data to be stored and/or transmitted in order to reduce the storage capacity and/or transmission time respectively. Compression may be achieved by using different compression algorithms known in the art, for example, by sequential data compression, which takes a stream of data as an input and generates a usually shorter stream of output from which the original data can be restored.

For example, pictorial and graphics images contain extremely large amounts of data. If the pictorial and graphics images are digitized to allow transmission or processing by digital data processors, such processing often requires many millions of byte to represent respective pixels of the pictorial or graphics image with quality fidelity. The purpose of image compression is to represent images with less data in order to save storage costs or transmission time and costs. For example, one example of compressing data/images involves the use of JPEG, which was developed by the Joint Photographic Experts Group and standardized in 1992, and is currently the most widely used compressed image format. Due to their already compressed nature, universal compression algorithms like Deflate, ZLIB, LZ cannot reduce the size of JPEG compressed files any further.

JPEG is primarily concerned with images that have two spatial dimensions, contain gray scale or color information, and possess no temporal dependence, as distinguished from the MPEG (Moving Picture Experts Group) standard. JPEG compression can reduce the storage requirements by more than an order of magnitude and improve system response time in the process. A primary goal of the JPEG standard is to provide the maximum image fidelity for a given volume of data and/or available transmission or processing time and any arbitrary degree of data compression is accommodated. It is often the case that data compression by a factor of twenty or more (and reduction of transmission time and storage size by a comparable factor) will not produce artifacts or image degradation which are noticeable to the average viewer. However, a need exists for increased efficiency and productivity by improving the image compression ratio of already compressed image content.

Accordingly, and in view of the foregoing, various exemplary method, system, and computer program product embodiments for real-time image recompression are provided. In one embodiment, by way of example only, compressed segments that are identified as having used at least one of a plurality of inefficient compression operations are partially decoded. The compressed segments are recompressed by employing context mapping.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 7 illustrates an exemplary block diagram showing a probability map in a computer system in which aspects of the present invention may be realized.

DETAILED DESCRIPTION OF CERTAIN EMBODIMENTS

Figure 1:
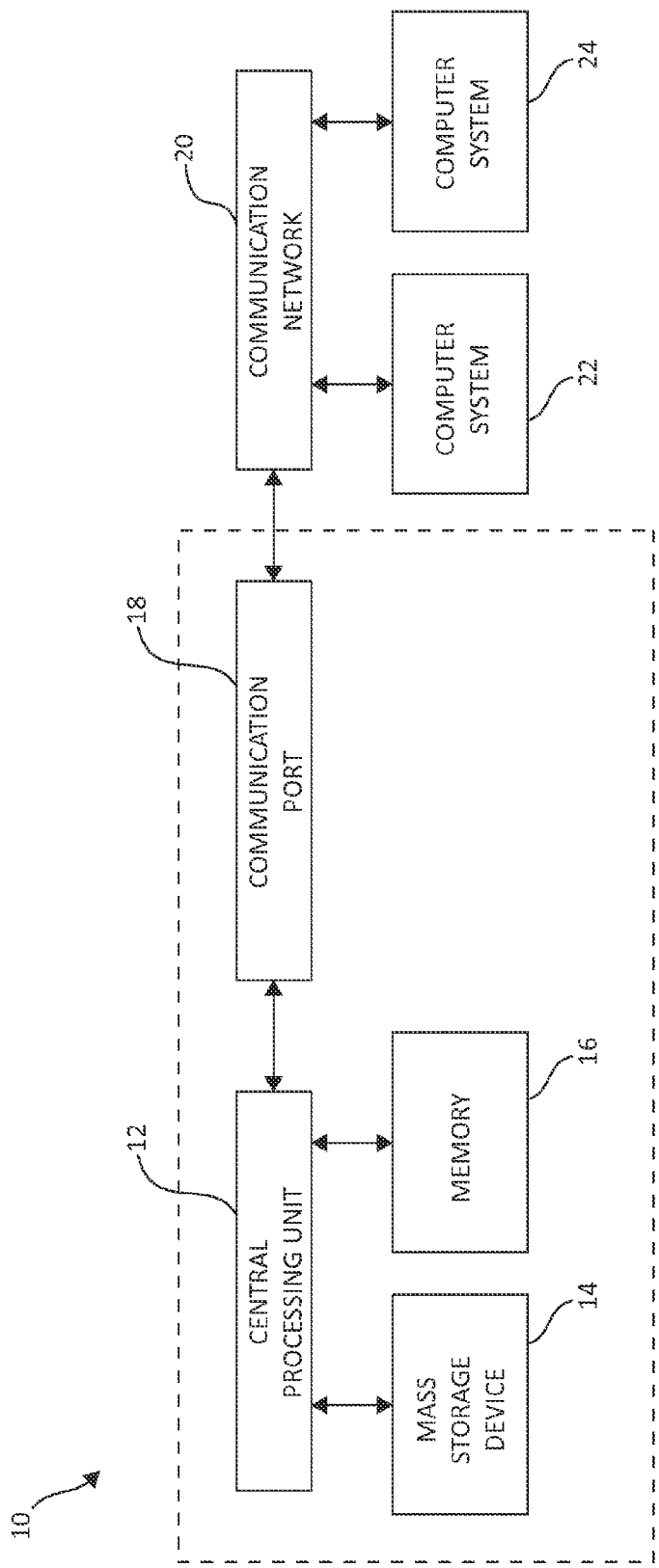
FIG. 1 illustrates a computer storage environment having an example storage device in which aspects of the present invention may be realized.

As mentioned previously, with increasing demand for faster, more powerful and more efficient ways to store information, optimization of storage technologies is becoming a key challenge. Logical data objects (data files, image files, data blocks, etc.) may be compressed for transmission and/or storage. Data compression techniques are used to reduce the amount of data to be stored and/or transmitted in order to reduce the storage capacity and/or transmission time respectively. Image files are typically stored in a compressed format to reduce the size of the storage footprint. The raw size of the image files is relatively large compared to the compressed format. The common approach is to compress large images using lossy compression like JPEG. However, using the lossy compression techniques, such as JPEG, results in some of the image details being lost while the image quality remains similar to the human eye. The current image compression algorithms use non-sophisticated methods.

Currently it is impossible to improve the image compression ratio in the storage array due to the following problems. First, the storage array needs to maintain bit-to-bit compatibility and may not use lossy compression or recompress the image data using another algorithm. Second, the data written to the storage is in progressive mode where the storage system receives only part of the image each time data is written. Third, using a standard compression algorithm that is unaware of the image content will not achieve any additional compression ratio.

In contrast, and to address the inefficiencies previously described, the mechanisms of the illustrated embodiments serve to perform real-time image recompression based upon a predictive operation (e.g., predictive algorithm). The mechanisms seek to maintain the bit-to-bit binary compatibility of the original compress image file while increasing the compression ratio. In one embodiment, by way of example only, compressed segments that are identified as having used at least one of a plurality of inefficient compression operations are partially decoded. Context mapping is employed to recompress the compressed segments. Moreover, the mechanisms may take the image components that are compressed through use of several inefficient techniques (e.g., Huffman coding, arithmetic coding, deflate streams, and ZLIB stream, etc.) and replace these compression methods by using a probability mapping table and recompressing the already compressed data by joining common parameters. For example, rather than encoding one bit of code, the mechanisms take many aspects of the image and combine them to a short code. Thus, rather than compress a bit of data, a sequence of data may be compressed thereby achieving a higher compression ratio.

Such mechanisms bridge the gap between applications and native storage platforms by understanding of how a given file is structured and then selecting from a portfolio of algorithms the one that is most effective for the targeted data set. By understanding the layout of specific application files/blocks, intelligent decisions may be determined how to compress the data for optimal storage. To accomplish these objectives, in one embodiment, the compression ratio is increased for a data segment that has already been compressed without employing the use of any lossy compression algorithms. In one embodiment, the mechanisms detect the image components and evaluate the compression method used for compressing the image components (e.g., the compression method may include Huffman coding, arithmetic coding, deflate stream, ZLIB stream, etc.). The image components that use inefficient compression methods (e.g., compression methods that yield lower compression ratio's) are than decoded. The mechanisms may join common parameters from the decoded components and apply prediction algorithms to each set of joined common parameters. In one embodiment, the mechanisms may be applied in real-time to progressive storage writes and may be implemented in the storage array thereby increasing the compression ratio, by way of example only, up to thirty percent (30%). The percentage of increased compression ratio may alter, change, and/or provide various increased percentages in other various embodiments.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). The backup operations further described may be executed on device(s) 14, located in system 10 or elsewhere. Memory device 16 may include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU) to execute and perform each operation described herein to accomplish the purposes of the present invention.

Figure 2:
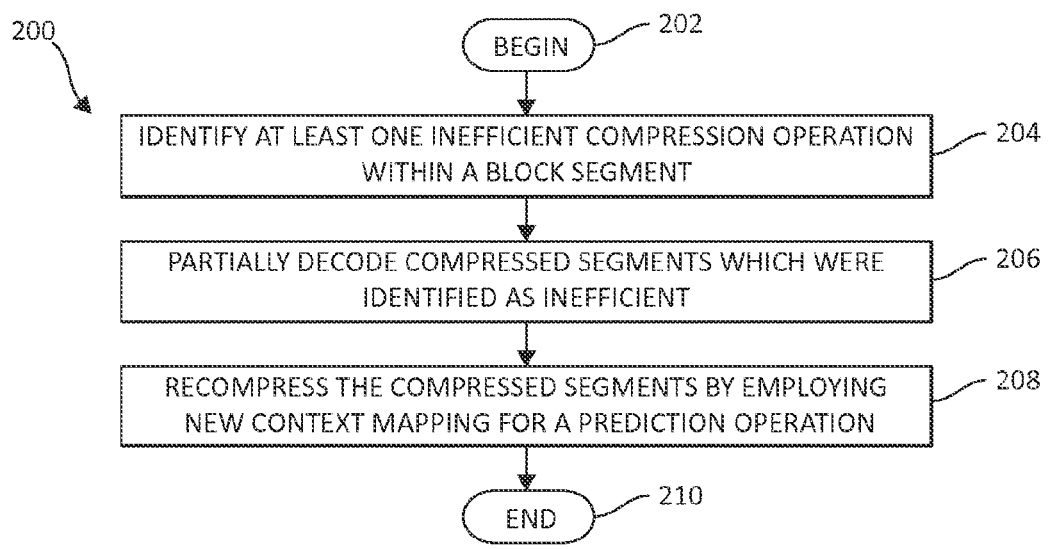
FIG. 2 is a flowchart illustrating an exemplary method for performing real-time image recompression.

FIG. 2 is a flowchart illustrating an exemplary method 200 for performing real-time image recompression in accordance with one embodiment. The method 200 begins (step 202) by identifying at least one inefficient compression operation with a block segment (step 204). Partially decoding compressed segments that are identified as having used at least one inefficient compression operations (step 206). The method 200 may recompress the compressed segments by employing new context mapping for a prediction operation (step 208). The method 200 ends (step 210).

Figure 5:
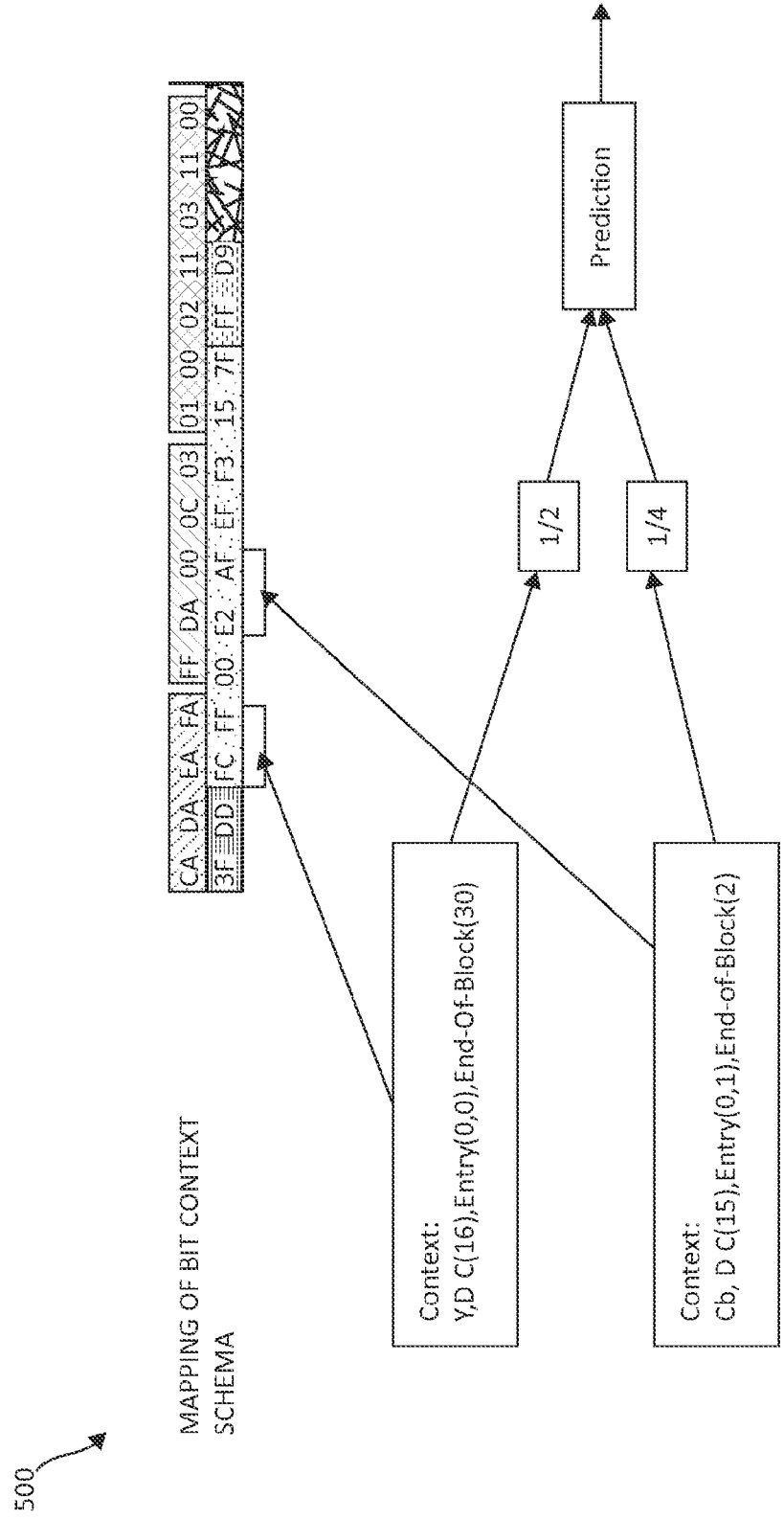
FIG. 5 illustrates an exemplary block diagram showing a mapping of bit context schema in which aspects of the present invention may be realized.

In one embodiment, the mechanisms may identify weak points (e.g., inefficient compression operations that yield lower compression ratios) in a compressed Image. The weak points are identified in the compressed file by looking for the usage of one of at least Huffman coding, arithmetic coding, deflate stream, and/or ZLIB Stream. For example, by using the JPEG compression operation, the JPEG file DC/AC coefficients are encoded using Huffman coding. In one embodiment, the mechanisms may identify the encoding mapping table corresponding to the each of the inefficient compression operations/formats of the compressed images (e.g., identify the JPEG Huffman table translation codes). Upon identifying these compression operations, the data segments (e.g., image components) may be partially uncompressed (e.g., partially decoded) back to the preliminary coefficients. For example, the image components may be uncompressed back to the original (pre-Huffman/decoded) codes to provide context for a subsequent code prediction, as illustrated in FIG. 5.

By so doing, the mechanisms may recompress the already compressed bit-stream without full extraction, which empowers increased encoding/decoding times since not all content data is recompressed. At this point, the already compressed binary data may be recompressed. The mechanisms may provide code context, which combines a large common denominator for the preliminary coefficients to map similar bit occurrences in a prediction operation. The code context applies to a compressed bit stream(s).

The mechanisms may identify a common denominator by mapping combined sets of extracted value code(s), common characteristics used for specific format, and sequence position based on file format (e.g., JPEG current component type Y, Cb, Cr or EOB marker). A fixed size length mapping table, which eliminates lowest common denominator from mapping, may be defined. The lowest common denominator is defined by a corresponding generated probability. Multiple sequence values may be extracted during the image scan order and may be combined for the recompression. For example, rather than just taking a value and replacing it with a simple mapping, a more complex mapping is constructed by taking a sequence of values rather than just one value. Thus, a value that appears the most may receive a shortest code. The common denominator may be identified by mapping combined sets of extracted value codes. For example, in JPEG there is a scan order that goes from luminance to chrominance, and then to the pixels, that are divided into 64 component values. So each of these values may be mapped to a probability map, which then generates a short code, based on the accumulated probability in the probability map. For example, there may be three possible Y sequences. The generation of short codes may then be performed using a range coder. A prediction operation may be performed whereby the probability of the current Y sequence may be predicted in accordance to the current probability map. The predication probability may be encoded. Thus, via the combination of these operations, the mechanisms provide increases in the image compression ratio, enable real-time processing and recompression, and maintain lossless compression of the data. Such operations are further illustrated as described below.

Figure 3:
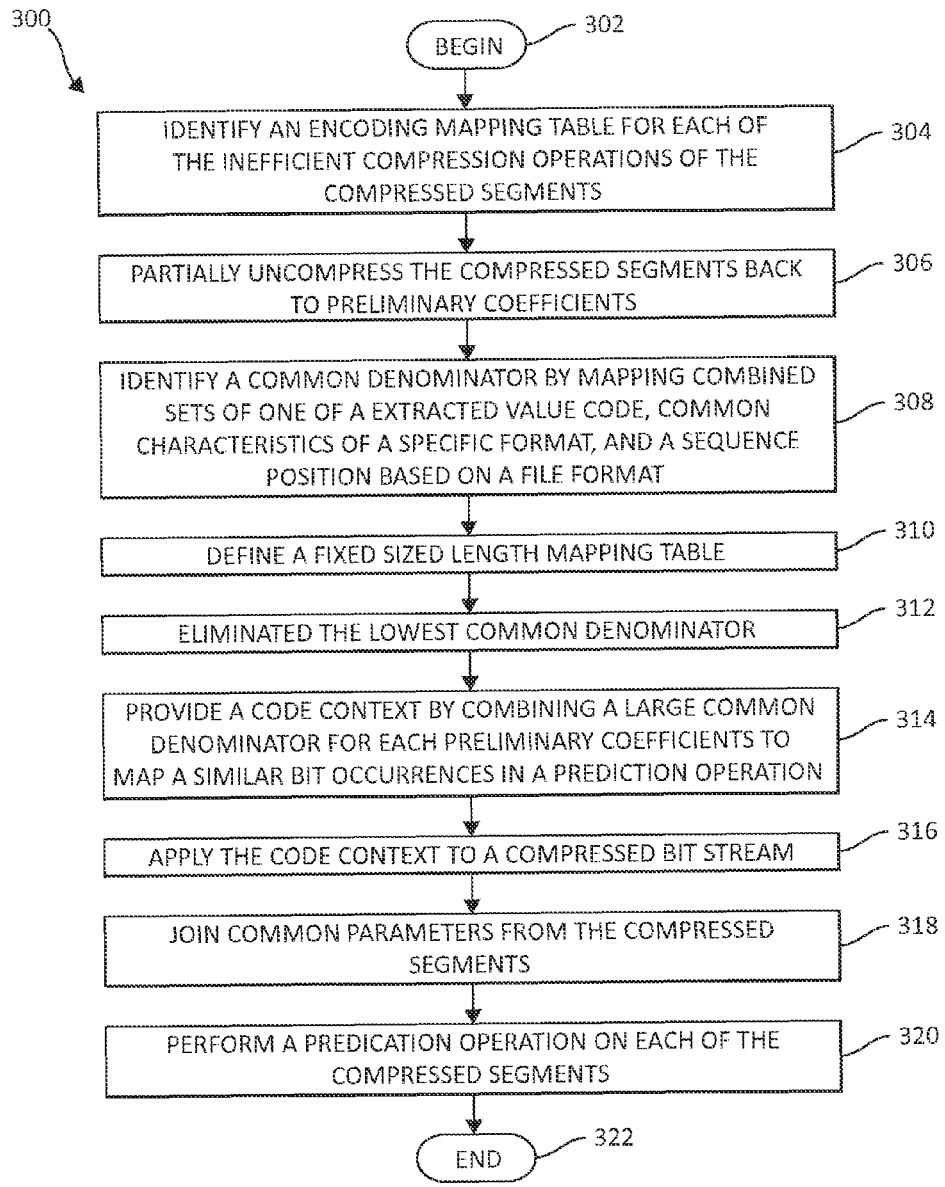
FIG. 3 is a flowchart illustrating an exemplary method for performing real-time image recompression by partially decoding compressed segments and recompressing the decoded compressed segments.

FIG. 3 is a flowchart illustrating an exemplary method 300 for performing real-time image recompression by partially decoding compressed segments and recompressing the decoded compressed segments. The method 300 begins (step 302) by identifying an encoding mapping table corresponding to each of the inefficient compression operations of the compressed segments (step 304). The method 300 will partially uncompress the compressed segments back to preliminary coefficients (step 306). A common denominator is identified by mapping combined sets of one of an extracted value code, common characteristics of a specific format, and a sequence position based on a file format (step 308). A fixed sized length mapping table is defined (step 310). The lowest common denominator may be eliminated (step 312). A code context may be provided by combining a large common denominator for each preliminary coefficient to map similar bit occurrences in a prediction operation (step 314). The code context may be applied to a compressed bit stream (step 316). Common parameters may be joined from the compressed segments (step 318). A predication operation is performed on each of the compressed segments (step 320). The method 300 ends.

Figure 4:
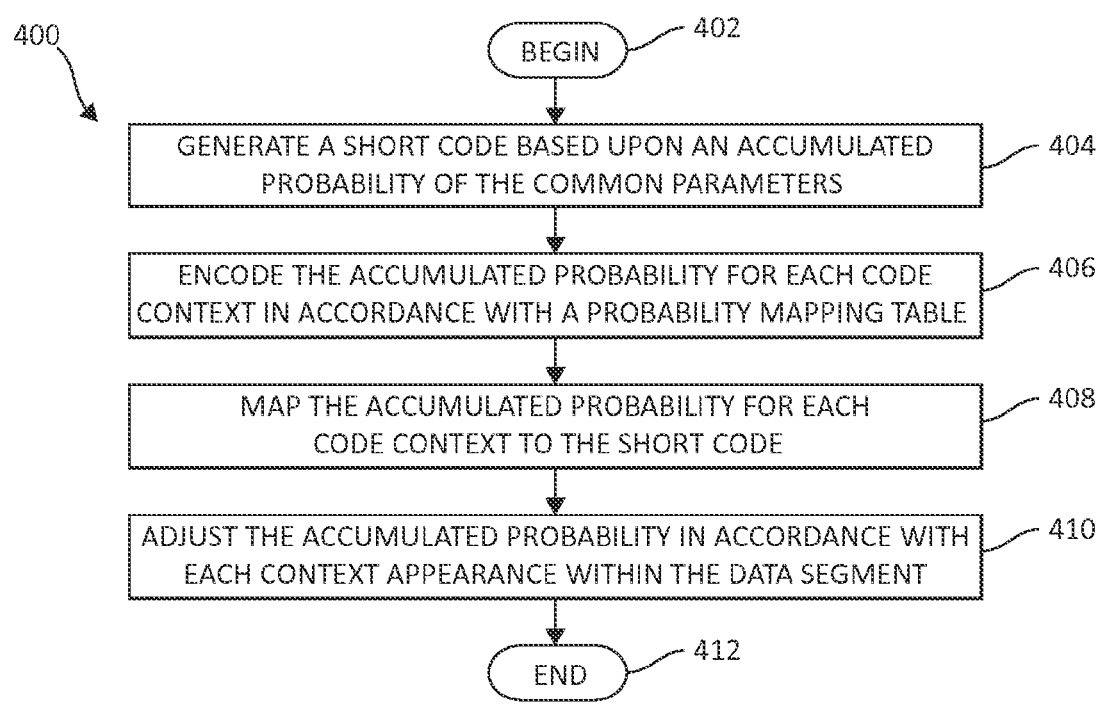
FIG. 4 is a flowchart illustrating an exemplary method for performing a prediction operation.

In one embodiment, the mechanisms may perform a prediction operation for the recompression of the partially decoded data segments. FIG. 4 is a flowchart illustrating an exemplary method 400 for performing a prediction operation. The method 400 begins (step 402) by generating a short code based upon an accumulated probability of the common parameters (step 404). The accumulated probability is encoded for each code context in accordance with a probability mapping table (step 406). The accumulated probability is mapped for each code context to the short code (step 408). The method may adjust the accumulated probability in accordance with each context appearance within the data segment (step 410). The method 400 ends (step 410).

FIG. 5 illustrates an exemplary block diagram 500 showing a mapping of bit context schema in a computing system in which aspects of the present invention may be realized. As previously mentioned, the mechanisms may identify weak points (e.g., inefficient compression operations) in a compressed Image. The weak points are identified in the compressed file by looking for the usage of one of at least Huffman coding, arithmetic coding, deflate stream, and ZLIB Stream.

In FIG. 5, the following illustrated embodiment depicts JPEG compressed images. FIG. 5, by way of example only, applies the aspects of the present invention to JPEG compressed images such as entry position, DC/Cb, end of block (EOB) that may be related to JPEG, but it should be noted that the mechanisms of the present invention apply to other image formats. FIG. 5 illustrates the mechanisms of the illustrated embodiments being applied to JPEG compressed images. For example, by using the JPEG compression operation, the JPEG file DC/AC coefficients are encoded using Huffman coding, as illustrated in FIG. 5. These DC/AC coefficients are illustrated with a matrix of 64 integer values, representing each component for Y, Cb, and Cr. As the binary number values approach 00 it represents an end of block (EOB). These values are represented in a bit context schema. Rather that just taking the DC values and mapping them using the Huffman coding, a sequence of values are taken for the luminance Y along with the DC values, and combine them with the end of block (EOB) with a specified frequency. The DC and Y value are mapped to a probability and a range and then encoded. Thus, by partially uncompressing back to the DCT coefficients (Huffman representation codes) to provide context for the next bit prediction, the mechanisms may recompress the already compressed bit-stream without full extraction, which provides for faster encoding/decoding.

The mechanisms replace the Huffman codes with shorter codes by assigning complex coefficients to the already compressed data and combining more than just one DC code as the encoded stream. Thus, more code context is taken into account such as the frequency of the matrix (e.g., each component is represented with a matrix of 6×6) and the position of the values. The mapping of the bit context schema provide bit contexts by: DC/AC Value, DC Entry, Component (Y, Cb, Cr), and End-Of-Block to map similar bit occurrences in a predictor operation and the context applies to compressed bit stream. For example, as illustrated in FIG. 5, the FC and the FF represent the DC value 16, the Y luminance entry (0,0), and the EOB is (30). For the Cb, with respect to the values of E2 and AF, the extracted DC value is 15, with the entry coordinates of (0,1), and the EOB is 2. The 50 per cent represents how many times the entries of position (0,0), with DC value 16, and EOB 30 appears (e.g., appears in the scan). The 25 per cent represents how many times the entries of (0,1), with the DC value code 15, with EOB value of 2 appears in the scan. These DC values that are extracted from these codes (e.g., FC, FF and/or E2 and AF) that represent the position, DC values, and/or color depth are combined in a probability map to create shorter codes, as seen in FIG. 7.

Figure 6:
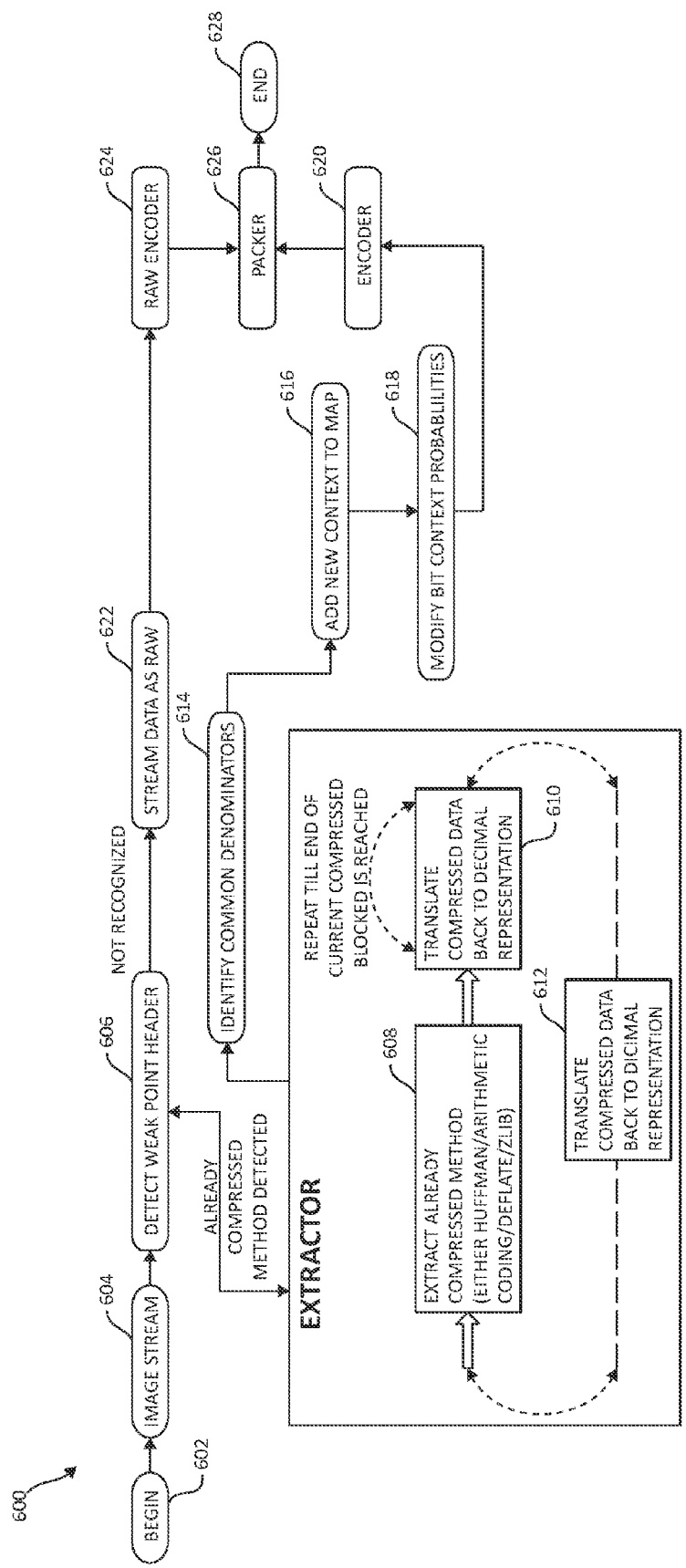
FIG. 6 is a flowchart illustrating an exemplary method for performing real-time image recompression based on a predictive operation.

FIG. 6 is a flowchart illustrating an exemplary method 600 for performing real-time image recompression based on a predictive operation. The method 600 begins (step 602) with receiving an image stream (step 604). The image stream is analyzed by detecting weak points in the header (step 606). In one embodiment, by way of example only, a search is performed for the weak points within an image stream by seeking for the header of the weak compression methods used: Huffman, Zlib, etc. If the image stream is already compressed, the method 600 will determine the inefficient compression method 600 that was used for compressing the image that results in lower compression ratios and then extract either Huffman/Arithmetic coding/Deflate/ZLIB operations/coding for the compression method (step 608). The method 600 will translate the compressed data (e.g., image) back to a decimal representation (step 610) and will repeat step 608 and 610 for all compressed blocks detected (step 612). Common denominators are identified (step 614) and new code context is added to a probability map (step 616). The method 600 will modify the bit context probabilities (step 618) and encode the bit context probabilities (step 620). In a final step, the encoded data is then sent to a packer (step 626). The method 600 ends (step 628). However, at step 606, if a weak point in the header is not detected, the method 600 will stream the data as raw (step 622) and then will send for encoding the raw data stream (step 624). The encoded data is then sent to a packer (step 626). The method 600 ends (step 628).

FIG. 7 illustrates an exemplary block diagram 700 showing a probability map in a computer system in which aspects of the present invention may be realized. In FIG. 7, the following illustrated embodiment depicts JPEG compressed images. FIG. 7, by way of example only, applies the aspects of the present invention to JPEG compressed images such as entry position, DC/Cb, end of block (EOB) that may be related to JPEG, but it should be noted that the mechanisms of the present invention apply to other image formats. FIG. 5 illustrates the mechanisms of the illustrated embodiments being applied to JPEG compressed images. As mentioned previously, based on the accumulated probability in the probability map, a new short code may be generated. For example, there may be three possible Y sequences. As depicted in FIG. 7, the probability map contains the code context, probability (e.g., the number 2 indicates the number of times we observed this sequence in the scan), and the range (e.g, a percentage value) for each of the possible Y sequences. In the first row, the context indicates Y DC Value (1255) color sequence short code (red, black, blue), and the EOB position of 30. The probability value assigned is 2 with a range of [0.0, 0.5] (this range value is 50% since it show 0 to 0.5 because the range may be divided between 0 and 1). The range is only a percentage of time we observed the context. The range for the first row is from 0 to 50 percent. Similarly, in the second row the context indicates Y DC Value (1234) color sequence short code (red, white, blue), and the EOB position of 12. In the third row, the context indicates Y DC Value (56) color sequence short code (black, white, black), and the EOB position of 12. The second and third range of [0.5, 0.75] is seen as 25 percent.

Thus, with the probability map, short codes may be generated by using a range coder. A prediction operation may be performed using the probability map whereby the probability of the current Y sequence, for example, may be predicted in accordance to the current probability map. The predication probability may be encoded and via the combination of these operations, the mechanisms provide increases in the image compression ratio, enable real-time processing and recompression, and maintaining the lossless compression of the data, and bit-to-bit compatibility and without using lossy compression.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for real-time image recompression by a processor device in a computing storage environment, the method comprising:
   partially decoding compressed segments that are identified as having used at least one of a plurality of inefficient compression operations;
   recompressing the compressed segments by employing context mapping, wherein in conjunction with the recompression, performing at least one of:
      identifying a common denominator by mapping combined sets of one of a extracted value code, common characteristics of a specific format, and a sequence position based on a file format, and
      defining a fixed sized length mapping table, wherein the lowest common denominator is eliminated;
   providing a code context by combining a large common denominator for each of a preliminary coefficients to map a plurality of similar bit occurrences in a prediction operation, wherein the code context is applied to a compressed bit stream;
   generating a short code based upon an accumulated probability of common parameters;
   encoding the accumulated probability for each of a code context in accordance with a probability mapping table; and
   mapping the accumulated probability for each of the code context to the short code.

2. The method of claim 1, further including identifying an encoding mapping table corresponding to each of the plurality of inefficient compression operations of the compressed segments.

3. The method of claim 1, further including, pursuant to the partial decoding, partially uncompressing the compressed segments back to preliminary coefficients.

4. The method of claim 1, further including, pursuant to the recompressing the compressed segments, joining the common parameters from the compressed segments, wherein a predication operation is performed on each of the compressed segments.

5. A system for real-time image recompression in a computing environment, comprising:
   a processor device operable in the computing environment, wherein processor device is adapted for:
      partially decoding compressed segments that are identified as having used at least one of a plurality of inefficient compression operations,
      recompressing the compressed segments by employing context mapping, wherein conjunction with the recompression, performing at least one of:
         identifying a common denominator by mapping combined sets of one of a extracted value code, common characterisitics of a specific format, and a sequence position based on file format, and
         defining a fixed sized length mapping table, wherein the lowest common denominator is eliminated, and
      providing a code context by combining a large common denominator for each of a preliminary coefficients to map a plurality of similar bit occurrences in a prediction operation, wherein the code context is applied to a compressed bit stream,
      generating a short code based upon an accumulated probability of common parameters,
      encoding the accumulated probability for each of a code context in accordance with a probability mapping table, and
      mapping the accumulated probability for each of the code context to the short code.

6. The system of claim 5, wherein the processor device is further adapted for identifying an encoding mapping table corresponding to each of the plurality of inefficient compression operations of the compressed segments.

7. The system of claim 5, wherein the processor device is further adapted for, pursuant to the partial decoding, partially uncompressing the compressed segments back to preliminary coefficients.

8. The system of claim 5, wherein the processor device is further adapted for, pursuant to the recompressing the compressed segments, joining the common parameters from the compressed segments, wherein a predication operation is performed on each of the compressed segments.

9. A computer program product for real-time image recompression in a computing environment by a processor device, the computer program product comprising a non-transitory computer-readable storage medium having computer-readable program code portions stored therein, the computer-readable program code portions comprising:

a first executable portion for partially decoding compressed segments that are identified as having used at least one of a plurality of inefficient compression operations; and a second executable portion for recompressing the compressed segments by employing context mapping, wherein in conjunction with the recompression, performing at least one of;

identifying a common denominator by mapping combined sets of one of a extracted value code, common characterisitics of a specific format, and a sequence position based on a file format, and defining a fixed sized length mapping table, wherein the lowest common denominator is eliminated; and a third executable portion for providing a code context by combining a large common denominator for each of a preliminary coefficients to map a plurality of similar bit occurrences in a prediction operation, wherein the code context is applied to a compressed bit stream;

a fourth executable portion for generating a short code based upon an accumulated probability of common parameters;

a fifth executable portion for encoding the accumulated probability for each of a code context in accordance with a probability mapping table; and a sixth executable portion for mapping the accumulated probability for each of the code context to the short code.

10. The computer program product of claim 9, further including a third executable portion for identifying an encoding mapping table corresponding to each of the plurality of inefficient compression operations of the compressed segments.

11. The computer program product of claim 9, further including a third executable portion for, pursuant to the partial decoding, partially uncompressing the compressed segments back to preliminary coefficients.

12. The computer program product of claim 9, further including a third executable portion for, pursuant to the recompressing the compressed segments, joining the common parameters from the compressed segments, a predication operation executed on each of the compressed segments.

* * * * *